Oct. 15, 1946.  R. D. BAGLEY ET AL  2,409,181
AIRBORNE CARGO TRUCK
Filed Sept. 19, 1944  3 Sheets-Sheet 1

INVENTORS.
RONALD D. BAGLEY
JOSEPH E. BERMAN
BY
C. E. Herrstrom & W. E. Thibodeau
ATTORNEYS Oct. 15, 1946.                R. D. BAGLEY ET AL                 2,409,181
                               AIRBORNE CARGO TRUCK
                              Filed Sept. 19, 1944         3 Sheets-Sheet 2

INVENTORS
                                                 RONALD D. BAGLEY
                                                 JOSEPH E. BERMAN
                                           BY
                                                   ATTORNEYS

Oct. 15, 1946.   R. D. BAGLEY ET AL   2,409,181
AIRBORNE CARGO TRUCK
Filed Sept. 19, 1944   3 Sheets-Sheet 3

INVENTORS
RONALD D. BAGLEY
JOSEPH E. BERMAN
BY
C. E. Herrstrom & A. E. Thibodeau
ATTORNEYS Patented Oct. 15, 1946

2,409,181

UNITED STATES PATENT OFFICE 2,409,181

AIRBORNE CARGO TRUCK

Ronald D. Bagley, Indiana, Pa., and Joseph E. Berman, Suffolk, Va.

Application September 19, 1944, Serial No. 554,828

1 Claim. (Cl. 180—12)

(Granted under the act of March 3, 1883, as amended April 30, 1928; 370 O. G. 757)

The invention described herein may be manufactured and used by or for the Government for governmental purposes without the payment to us of any royalty thereon.

This invention relates generally to cargo trucks and has particular reference to a multi-wheeled cargo truck adapted to be partially disassembled into sections small enough to be stowed in cargo airplanes and mobile enough to be readily loaded therein.

Heretofore it has been impossible to transport by air anything but extremely small vehicles due to the limitations in storage space available in existing cargo airplanes and to the relatively small doors through which cargo must be loaded into the airplane. As a result thereof, military operations in areas not accessible over land have been handicapped due to the lack of cargo trucks.

It is an object of the present invention to provide a cargo truck adapted to be disassembled into relatively small sections for storage in cargo airplanes, the sections being mobile enough to be readily loaded through the relatively small doors of an airplane.

It is a further object of the invention to provide a cargo truck of the type described which may be rapidly and easily disassembled and reassembled without special equipment, thereby making the truck ready for operation in military combat areas within a relatively short space of time.

Another object of the invention is to provide a cargo truck separable into sections, the forward section of which is adapted to be driven under its own power into an airplane.

These and other objects of the invention will be made more apparent as this description proceeds, particularly when considered in connection with the accompanying drawings in which.

Figure 1:
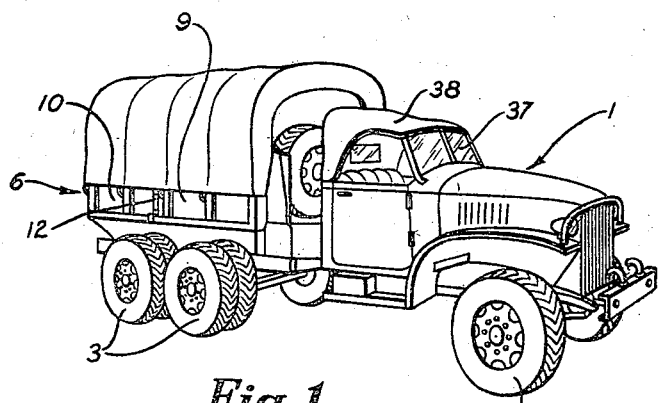
Figure 1 is a perspective view of a cargo truck embodying the present invention.

Referring now more in particular to the drawings, it will be noted that in Figure 1 is illustrated a six-wheeled cargo vehicle 1 of the type having both the front wheels 2 and the rear wheels 3 power driven. The drive to the rear wheels is not illustrated, this being a well known drive practice in trucks, and at this time commonly utilizes a drive shaft separably connected at a universal joint beneath the driver's cab to the driven shaft from the transmission of the power unit in the forward part of the truck. The latter details and conventional brake connections also are not illustrated, being well understood and being generally similar in various commercial truck assemblies. In order to permit the storage of a relatively large and heavy truck of this type in a cargo airplane, the truck 1 is adapted to be disassembled into a forward section 4, Figure 2, and a rearward section 5, Figure 3. In addition, certain other portions of the vehicle are detached therefrom in order to make the sections 4 and 5 small enough to be loaded into an airplane through the cargo doors thereof.

Figure 6:
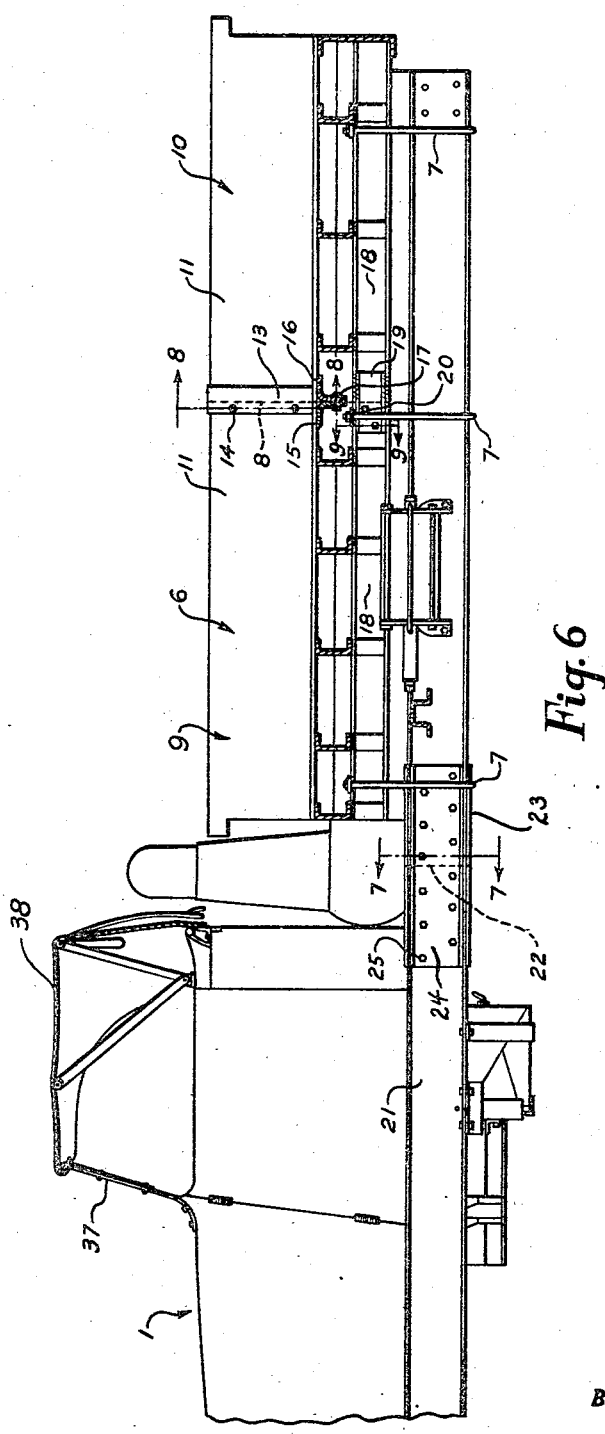
Figure 6 is a fragmentary longitudinal cross-section taken substantially centrally of the truck.

Referring now to Figure 6, the truck body 6 is adapted to be removed from the chassis by disconnecting the U-bolts 7. The body 6 is transversely cut at 8 dividing it into two sections 9 and 10. These two sections are joined together by reinforcing members bolted to the sections of the body and adapted to be readily disconnected.

Figure 8:
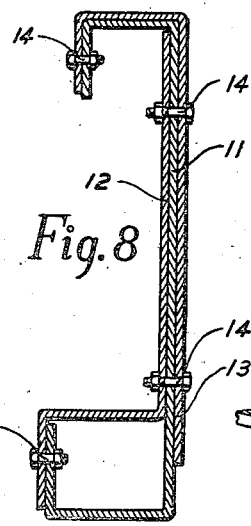
Figure 8 is a cross-section taken on the plane indicated by the line 8—8 of Figure 6.

In detail, the channel-shaped side members 11 of the body are secured together by the reinforcing member 12, Figure 8, positioned adjacent the inner side of the channel 11 and the reinforcing member 13 positioned adjacent the outer side of the channel. The reinforcing members 12 and 13 are welded to the rearward section 10 of the body and extend forwardly, overlapping the joint between the body sections, and are bolted to the forward section 9 by means of the bolts 14.

Extending transversely of the body 6 at the joint between the sections 9 and 10 are a pair of angle irons 15 and 16. The angle iron 15 is welded to the section 9 of the body and the angle iron 16 is welded to the section 10. The two angle irons are bolted together by bolts 17.

Figure 9:
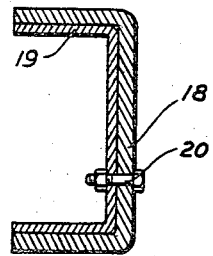
Figure 9 is a cross-section taken on the plane indicated by the line 9—9 of Figure 6.
Figure 10:
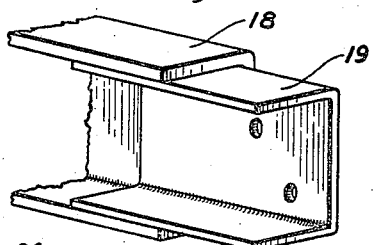
Figure 10 is a fragmentary perspective view of the construction shown in Figure 9.

Longitudinally extending body frame members 18 are also transversely cut at the line 8 and are joined together by a reinforcing channel 19, Figure 9. The channel 19 is welded to one section of the frame member 18 as shown in Figure 10 and is adapted to be bolted to the other frame member by bolts 20.

Figure 7:
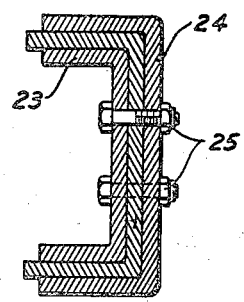
Figure 7 is a cross-section taken on the plane indicated by the line 7—7 of Figure 6.

The chassis frame 21 of the truck is transversely cut at 22, Figure 6, and the sections thereof are joined together by inner and outer reinforcing channel members 23 and 24 respectively, the latter being bolted together by bolts 25 as shown in Figure 7.

As described above, the body 6 of the truck is adapted to be removed from the chassis and separated into two sections for storage in any available part of an airplane. Separation of the chassis frame 21 at the point 22 divides the remaining portion of the truck into the forward section 4 and the rearward section 5. It will be understood of course that this separation is accompanied by disconnecting the propeller shaft of the vehicle and also disconnecting the brake lines and all other control mechanisms extending between the forward and rearward sections of the truck.

It will be noted that the rearward section 5 now remaining after separation of the forward section of the vehicle and removal of the truck body comprises a self supported mobile unit including a portion of the frame 21 and the four rear wheels 3. This section can be readily loaded into an airplane by pushing or hauling the section up a ramp to the cargo door of the plane. If necessary to permit the section 5 to pass through the doors, the outer dual wheels may be removed. This section can be positioned longitudinally of the plane by "bouncing" the section around upon the wheels 3.

Figure 4:
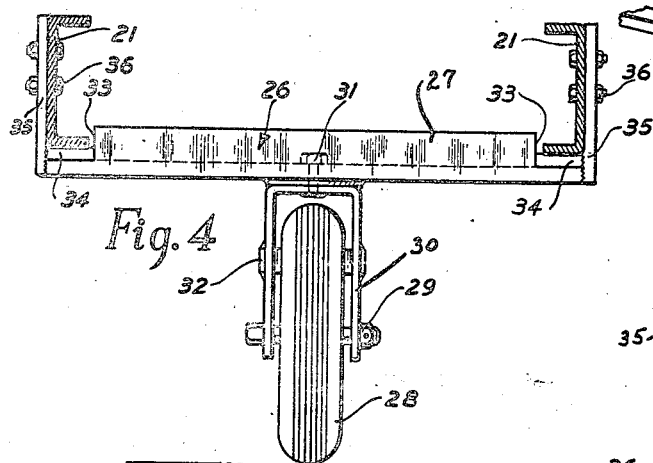
Figure 4 is an end elevation of a dolly adapted to support the truck section shown in Figure 2.
Figure 5:
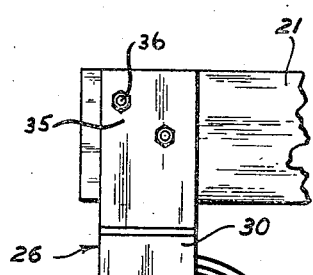
Figure 5 is a side elevation of the construction shown in Figure 4.
Figure 5:
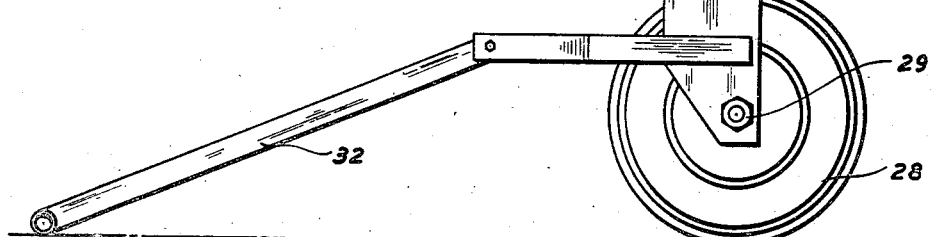

The truck 1 is provided with a dolly 26 for supporting the rearward portion of the frame of the forward section 4 of the truck. As shown in Figure 4, the dolly 26 comprises a frame 27, a wheel 28 mounted on an axle 29 journalled in a U-shaped supporting member 30, the latter being pivotally connected to the frame 27 of the dolly at 31. A handle 32 is provided and is attached to the U-shaped supporting member 30 to enable the turning of the wheel 28 to be controlled.

Opposite extremities of the transversely extending frame member 27 of the dolly are recessed as at 33 and are provided with pads 34 adapted to receive the channel-shaped frame members 21 of the truck chassis. Upright guide members 35 are welded to the extreme ends of the frame 27 and form supporting members to which the chassis frame 21 of the vehicle may be secured by means of the bolts 36.

Figure 2:
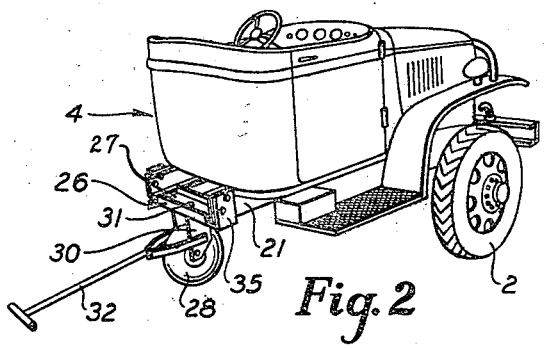
Figure 2 is a perspective view of the forward section of the cargo truck shown in Figure 1 ready for storage in an airplane.
Figure 3:
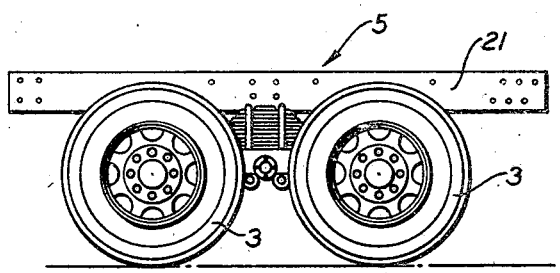
Figure 3 is a side elevation of the rearward portion of the truck shown in Figure 1 ready for storage in an airplane.

As shown in Figure 2, the windshield 37 and the hood 38 of the driver's cab have been removed to decrease the overall height of the forward section 4. Inasmuch as the front wheels 2 of the truck are power driven by the engine, it will be apparent that the forward section 4, the rear end of which is supported by the dolly 26, comprises a self-powered mobile unit which may be driven by its own power up a ramp and through the cargo door of an airplane. During the loading operation, the handle 32 of the dolly may be maneuvered to turn the wheel 28 and to guide the forward section 4 into its proper storage position longitudinally of the airplane.

From the foregoing, it will be apparent that we have provided a cargo truck adapted to be transported by air and thus able to perform a vital function in military operations in combat areas. In addition, the assembly and disassembly of the truck and the loading and unloading thereof may be performed rapidly by an experienced crew thus enabling the truck to be in operation soon after the plane is landed. Although it is contemplated utilizing two cargo airplanes to transport the components of one cargo truck, nevertheless, any suitable arrangement of the truck components in one or more airplanes may be used.

Although we have herein above described one specific embodiment of the present invention, it will be understood that the invention is not to be limited in scope except as determined by the appended claim.

The rear section 5 after removal of the body comprises the essential pay load element of the truck, and various bodies other than specifically described may be constructed thereon or it may be used without a body for some loads. It may be termed a "pay load" unit of the truck, while the forward section 4 may be considered a locomotive and control unit.

What we claim is:

A self-powered cargo vehicle having front and rear wheeled parts and being adapted to be disassembled into sections small enough and mobile enough to be stowed without hoist machinery through conventional cargo loading doors of airplane cargo carriers; comprising a chassis having a main longitudinal frame formed in longitudinally discrete parts separable to divide the vehicle into a wheeled rear pay load unit and a steering wheeled forward locomotive and control unit including a power plant permanently operatively connected to the wheels thereof, separable means interconnecting the two said units in rigid mutual relation, and a dolly at, and in supporting relation to, the rear end of said frame part of the locomotive and control unit, said dolly including a manually dirigible wheel and a hand tongue for turning the wheel around a vertical axis, means being included to fix the dolly releasably to the said frame part of the locomotive unit.

RONALD D. BAGLEY.
JOSEPH E. BERMAN.